US005983173A

United States Patent [19]

Inoue et al.

[11] Patent Number: 5,983,173

[45] **Date of Patent: *Nov. 9, 1999**

[54] ENVELOPE-INVARIANT SPEECH CODING BASED ON SINUSOIDAL ANALYSIS OF LPC RESIDUALS AND WITH PITCH CONVERSION OF VOICED SPEECH

[75] Inventors: Akira Inoue, Tokyo; Masayuki Nishiguchi; Jun Matsumoto, both of Kanagawa, all of Japan

[73] Assignee: Sony Corporation, Tokyo, Japan

[ * ] Notice: This patent is subject to a terminal disclaimer.

[21] Appl. No.: 08/970,763

[22] Filed: Nov. 14, 1997

[30] Foreign Application Priority Data

Nov. 19, 1996 [JP] Japan .................................... 8-308259

[51] Int. Cl.[6] ................................ G01L 3/02; G01L 9/14

[52] U.S. Cl. .......................... 704/219; 704/208; 704/214; 704/262

[58] Field of Search .................................... 704/205, 207, 704/208, 214, 219, 262, 268

[56] References Cited

U.S. PATENT DOCUMENTS

| | | | |
|---|---|---|---|
| 5,054,072 | 10/1991 | McAulay et al. | 704/207 |
| 5,305,421 | 4/1994 | Li | 704/219 |
| 5,617,507 | 4/1997 | Lee et al. | 704/200 |
| 5,729,694 | 3/1998 | Holzrichter et al. | 705/17 |

FOREIGN PATENT DOCUMENTS

| | | | |
|---|---|---|---|
| 0260053 | 3/1988 | European Pat. Off. | G10L 7/06 |
| 0745971 | 12/1996 | European Pat. Off. | G10L 9/14 |
| 0 770 987 A2 | 5/1997 | European Pat. Off. | G10L 7/06 |
| WO9304467 | 3/1993 | WIPO | G10L 5/00 |
| WO9530983 | 11/1995 | WIPO | G10L 9/00 |

OTHER PUBLICATIONS

R. Ansari et al., IEEE Signal Process. Lett., 5(3), 60–62 (1998).

J. Moorer, J. Audio Eng. Soc., 27(3), 134–140 (1979).

T.F. Quatieri et al., IEEE Trans. Signal Process., 40(3), 497–510 (1992).

*Primary Examiner*—David R. Hudspeth

*Assistant Examiner*—Tālivaldis Ivars Šmits

*Attorney, Agent, or Firm*—Jay H. Maioli

[57] ABSTRACT

To conduct pitch control of a voiced speech signal that is to be coded or decoded, the voiced signal is subjected to sinusoidal analysis coding for each coding unit obtained by dividing the voiced signal on the time axis at a predetermined coding unit. A linear predictive residual of the voiced signal is taken out, and resultant voiced signal coded data are processed. A pitch component of the voiced signal coded data coded by the sinusoidal analysis coding is altered without changing the phonemes by a predetermined computation processing in a pitch conversion unit.

36 Claims, 5 Drawing Sheets

ENVELOPE-INVARIANT SPEECH CODING BASED ON SINUSOIDAL ANALYSIS OF LPC RESIDUALS AND WITH PITCH CONVERSION OF VOICED SPEECH

BACKGROUND OF THE INVENTION

1. Field of the Invention

The present invention relates to a coding method and a decoding method applied to the case where a voice signal is subjected to high efficiency coding or decoding, a coding device, a decoding device and a telephone device to which the coding method and the decoding method are applied, and various media on which processing data of the coding and decoding are recorded.

2. Description of the Related Art

There are known various coding methods in which a signal compression is conducted by utilizing the statistical characteristics of an audio signal (where the audio signal includes a voice signal and a sound signal) in the time domain and the frequency domain and the characteristics of the human auditory sense. The coding methods are broadly classified into coding in the time domain, coding in the frequency domain, analysis-synthesis coding and so on.

As examples of high efficiency coding of a voice signals, MBE (multiband excitation) coding, SBE (singleband excitation) or sinusoidal synthesis coding, Harmonic coding, SBC (sub-band coding), LPC (linear predictive coding), DCT (discrete cosine transform), MDCT (modified DCT), FFT (fast Fourier transform) and so on are known.

In the case where a voiced signal is coded by using the above described various coding methods or in the case where the coded voiced signal is decoded, it is sometimes desired to change the pitch of a voice without changing the phonemes of the voice.

In the conventional high efficiency coding device and high efficiency decoding device of a voiced signal, the pitch change is not considered and it is necessary to connect a separate pitch control device and conduct the pitch conversion, resulting in a disadvantage of a complicated configuration.

SUMMARY OF THE INVENTION

In view of such points, an object of the present invention is to make it possible to conduct a desired pitch control accurately with simple processing and configuration without changing the phonemes when conducting coding processing and decoding processing on a voiced signal.

In order to solve the above described problems, when dividing a voiced signal on a time axis at a predetermined coding units, deriving a linear predictive residual in each coding unit, conducting sinusoidal analysis coding on the linear predictive residual, and processing on the voice coded data, a pitch component of voiced signal coded data coded by the sinusoidal analysis coding is adapted to be altered by a predetermined computation processing in accordance with the present invention.

According to the present invention, pitch conversion can be simply conducted without changing the phoneme components in computation processing of voiced signal coded data coded by the sine wave analysis coding.

DESCRIPTION OF THE PREFERRED EMBODIMENTS

Hereafter, an embodiment of the present invention will be described by referring to the attached drawings.

Figure 1:
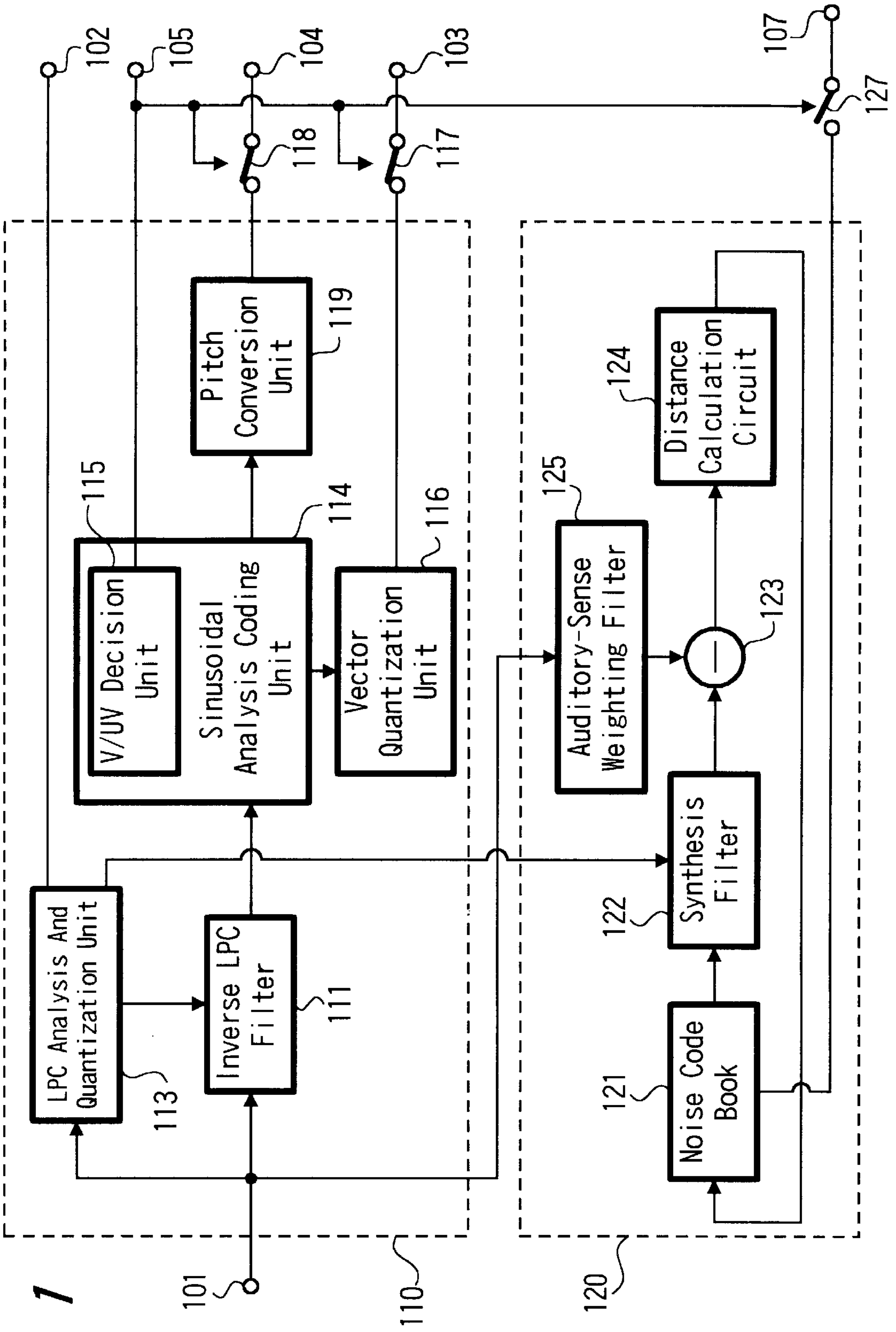
FIG. 1 is a block diagram showing the basic configuration of an example of the voiced signal coding apparatus according to an embodiment of the present invention.
Figure 3:
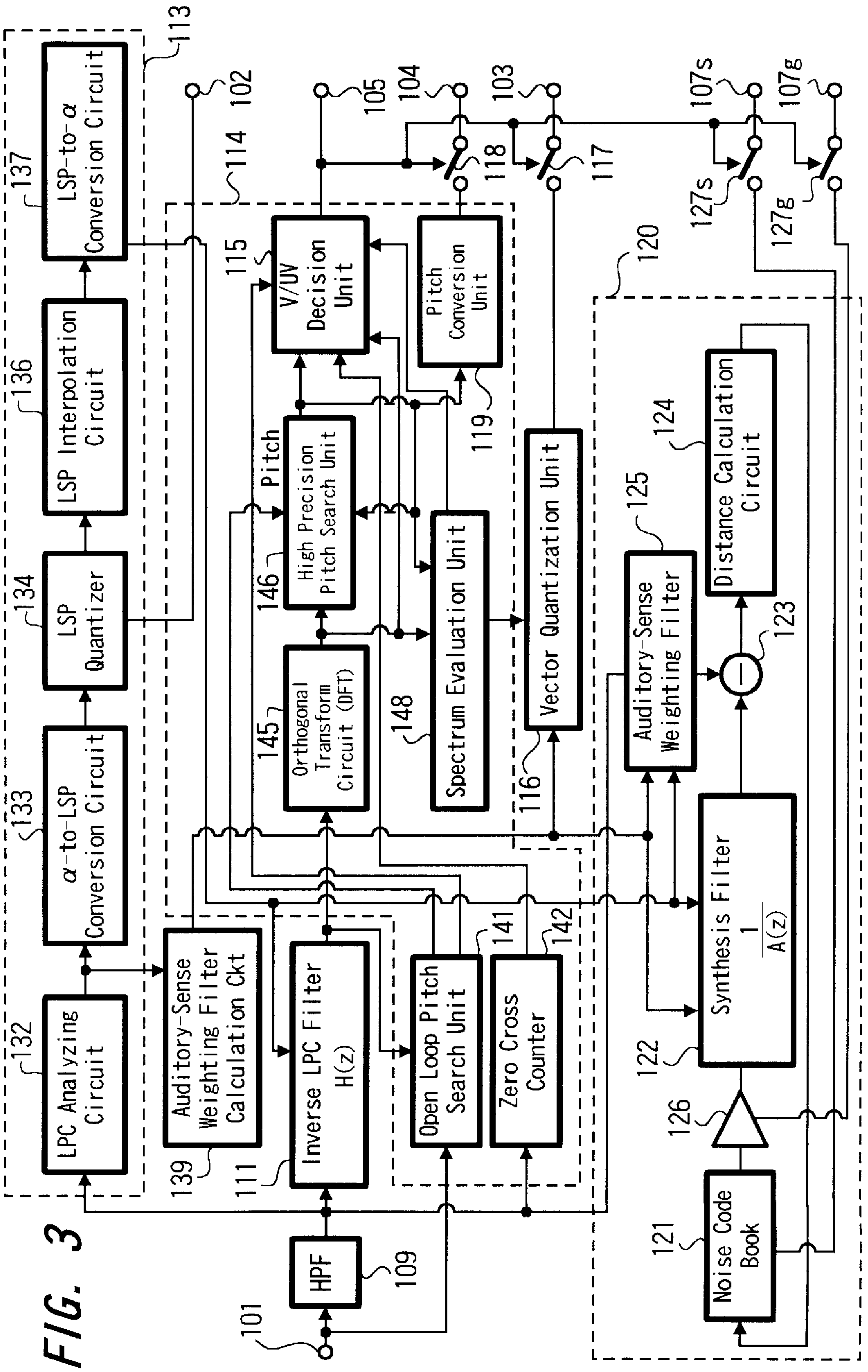
FIG. 3 is a block diagram showing a more concrete configuration of the voiced signal coding device of FIG. 1.

FIG. 1 is a block diagram showing the basic configuration of an example of a voiced signal coding apparatus, and FIG. 3 is a block diagram showing its detailed configuration.

The basic concept of the voice processing of the embodiment of the present invention will now be described. On the coding side of the voiced signal, the technique of dimension conversion or number of data conversion proposed before by the present inventors et. al. and described in Japanese laid-open patent publication No. 6-51800 is used. At the time of quantization of the amplitude of the spectrum envelope using the technique, vector quantization is performed with the number of harmonics being kept at a constant number, i.e, the constant number of dimensions. Since the shape of the spectrum envelope is thus unchanged, the phoneme components contained in the voice component does not change.

In the basic concept, the voiced signal coding device of FIG. 1 includes a first coding unit 110 for deriving a short-term predictive residual, such as an LPC (linear predictive coding) residual and performing the sinusoidal analysis coding, such as harmonic coding, and a second coding unit 120 for performing coding by means of waveform coding with phase transmission for the input voiced signal. The first coding unit 110 is used for coding a V (voiced) portion of the input signal, whereas the second coding unit 120 is used for coding an UV (unvoiced) portion of the input signal.

In the first coding unit 110, a configuration for conducting, for example, the sinusoidal analysis coding, such as the harmonic coding or multiband excitation (MBE) coding, on the LPC residual is used. In the second coding unit 120, a configuration of, for example, the code excitation linear predictive (CELP) coding by means of vector quantization with closed loop search of an optimum vector using an analysis method by means of synthesis is used.

In the example of FIG. 1, a voiced signal supplied to an input terminal 101 is sent to an LPC inverse filter 111 and an LPC analysis and quantization unit 113 of the first coding unit 110. An LPC coefficient or a so-called α parameter derived from the LPC analysis and quantization unit 113 is sent to the LPC inverse filter 111. By the LPC inverse filter 111, the linear predictive residual (LPC predictive) of the input voiced signal is taken out. From the LPC analysis and quantization unit 113, a quantized output of a LSP (linear spectrum pair) is taken out as described later and sent to an output terminal 102. The LPC residue from the LPC inverse filter 111 is sent to a sinusoidal analysis coding unit 114.

In the sinusoidal analysis coding unit 114, a pitch detection and a spectrum envelope amplitude calculation are conducted. In addition, a V(voiced)/UV(unvoiced) decision is conducted by a V/UV decision unit 115. Spectrum envelope amplitude data from the sinusoidal analysis coding unit 114 is sent to a vector quantization unit 116. As a vector quantization output of the spectrum envelope, a code book index from the vector quantization unit 116 is sent to an output terminal 103 via a switch 117. A pitch data output which is pitch component data supplied from the sinusoidal analysis coding unit 114 is sent to an output terminal 104 via a pitch conversion unit 119 and a switch 118. A V/UV decision output from the V/UV decision unit 115 is sent to an output terminal 105, and sent to the switches 117 and 118 as control signals thereof. At the time of the above described voiced (V) sound, the above described index and pitch are selected and taken out from the output terminals 103 and 104, respectively.

Upon receiving a pitch conversion command, the pitch conversion unit 119 changes the pitch data by means of computation processing based upon the command and conducts the pitch conversion. Detailed processing thereof will be described later.

At the time of the vector quantization in the vector quantization unit 116, amplitude data corresponding to one block of the effective band on the frequency axis is subjected to the following processing. An appropriate number of such dummy data as to interpolate values from the tail data in the block to the head data in the block, or an appropriate number of such dummy data as to extend the tail data and the head data are added to the tail and the head. The number of data is thus expanded to $N_F$. Thereafter, oversampling of $O_s$ times (such as, for example, 8 times) of the band limiting type is effected to derive as many as $O_s$ times amplitude data. The amplitude data of $O_s$ times in number $((m_{MX}+1)\times O_s)$ amplitude data) are subjected to linear interpolation and thereby expanded to more data, i.e., $N_M$ (such as, for example, 2048) data. The $N_M$ data are thinned and thereby converted to a constant number M (such as, for example 44) data, and thereafter subjected to vector quantization.

In this example, the second coding unit 120 has a CELP (code excitation linear predictive) coding configuration. An output from a noise code book 121 is subjected to synthesis processing in a weighting synthesis filter 122. A resultant weighted and synthesized voice is sent to a subtracter 123. An error between the resultant weighted and synthesized voice and a voice obtained by passing the voiced signal supplied to the input terminal 101 through an auditory sense weighting filter 125 is taken out. This error is sent to a distance calculation circuit 124 and subjected to a distance calculation therein. Such a vector as to minimize the error is searched for in the noise code book 121. The vector quantization of the time-axis waveform using the "analysis by synthesis" method and the closed loop search is thus conducted. This CELP coding is used for coding the unvoiced portion as described above. Via a switch 127 which will be turned on when the V/UV decision result supplied from the V/UV decision unit 115 is the unvoiced (UV) sound, a code book index supplied from the noise code book 121 as UV data is taken out from an output terminal 107.

By referring to FIG. 2, the basic configuration of a voice signal decoding device for decoding the voice coded data coded by the voice signal coding device of FIG. 1 will now be described.

Figure 2:
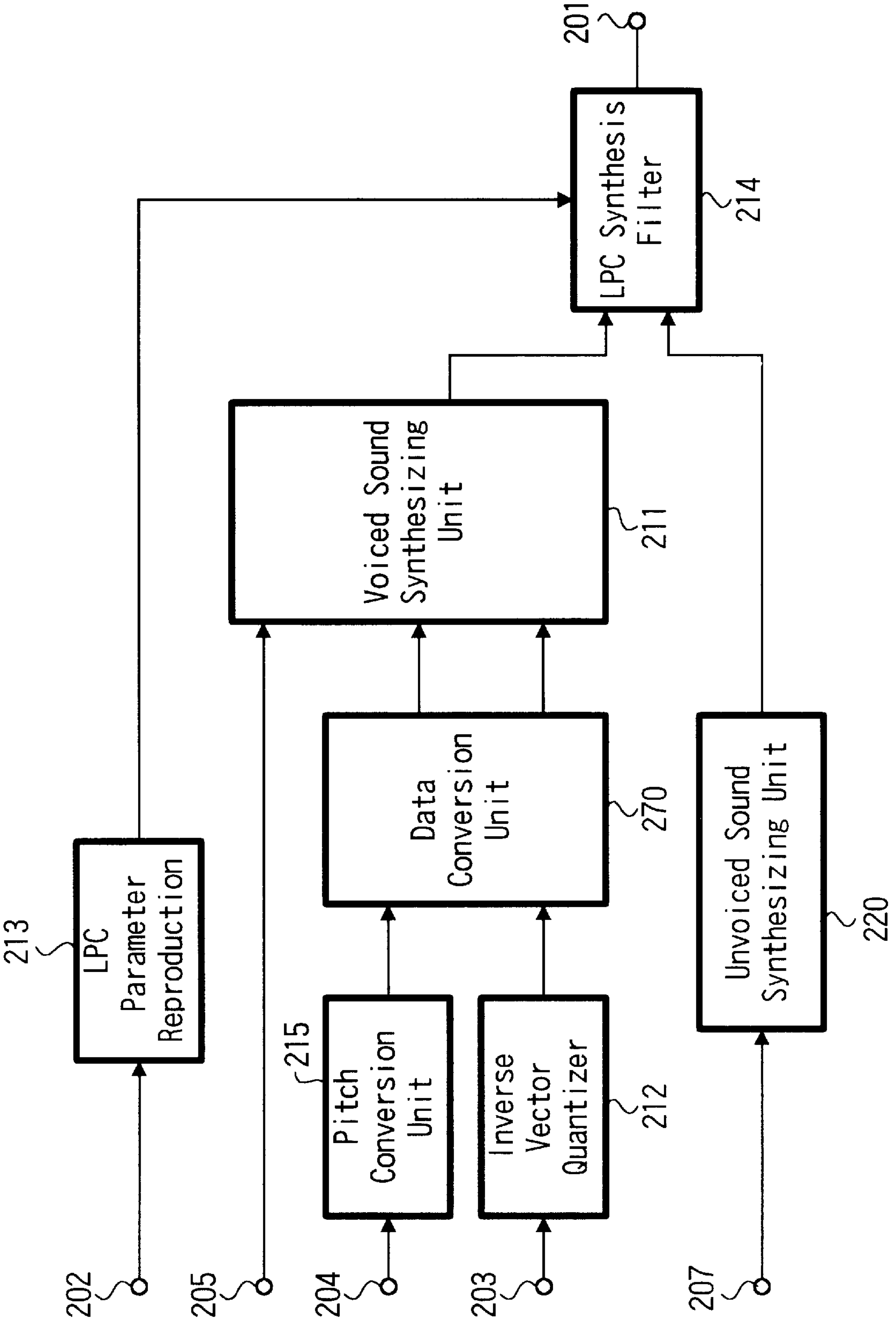
FIG. 2 is a block diagram showing the basic configuration of the voiced signal decoding device according to an embodiment of the present invention.

In FIG. 2, the code book index supplied from the output terminal 102 as the quantization output of the LSP (linear spectrum pair) described with reference to FIG. 1 is inputted to an input terminal 202. To input terminals 203, 204 and 205, outputs from the output terminals 103, 104 and 105 of FIG. 1, i.e., the index obtained as the envelope quantization output, the pitch, and the V/UV decision output are inputted, respectively. To an input terminal 207, the index supplied from the output terminal 107 of FIG. 1 as data for the UV (unvoiced) sound is inputted.

The index supplied to the input terminal 203 as the spectrum envelope quantization output of the LPC residue is sent to an inverse vector quantizer 212, subjected to inverse vector quantization therein, and then sent to a data conversion unit 270. To the data conversion unit 270, the pitch data from the input terminal 204 is supplied via a pitch conversion unit 215. From the data conversion unit 270, as many amplitude data as corresponding to the preset pitch of the spectrum envelope of the LPC residual and the changed pitch data are sent to a voiced sound synthesis unit 211. Upon receiving a pitch conversion command, the pitch conversion unit 215 changes the pitch data by means of computation processing based upon the command and conducts the pitch conversion. Detailed processing thereof will be described later.

The voiced synthesis unit 211 synthesizes the LPC (linear predictive coding) residual of the voiced portion by using the sinusoidal synthesis. To the voiced synthesis unit 211, the V/UV decision output from the input terminal 205 is also supplied. The LPC residual of the voiced sound supplied from the voiced synthesis unit 211 is sent to an LPC synthesis filter 214. The index of the UV data from the input terminal 207 is sent to an unvoiced synthesis unit 220, and the LPC residue of the unvoiced portion is taken out therein by referring to the noise code book. This LPC residual is also sent to the LPC synthesis filter 214. In the LPC synthesis filter 214, the LPC residual of the voiced portion and the LPC residual of the unvoiced portion are subjected to LPC synthesis processing respectively independently. Alternatively, the sum of the LPC residue of the voiced portion and the LPC residue of the unvoiced portion may be subjected to the LPC synthesis processing. Here, the LSP index from the input terminal 202 is sent to an LPC parameter regeneration unit 213, and the α parameter of the LPC is taken out therein and sent to the LPC synthesis filter 214. A voiced signal obtained by the LPC synthesis in the LPC synthesis filter 214 is taken out from an output terminal 201.

A more concrete configuration of the voiced signal coding device shown in FIG. 1 will now be described by referring to FIG. 3. In FIG. 3, components corresponding to those of FIG. 1 are denoted by the like reference numerals.

In the voiced signal coding device shown in FIG. 3, a voiced signal supplied to the input terminal 101 is subjected to filter processing for removing signals of unnecessary bands in a high-pass filter (HPF) 109. Thereafter, the voiced signal is sent to an LPC analysis circuit 132 of the LPC (linear predictive coding) analysis and quantization unit 113 and the LPC inverse filter circuit 111.

The LPC analysis circuit 132 of the LPC analysis and quantization unit 113 applies a Hamming window by taking the length of approximately 256 samples of the input signal waveform as one block, and derives a linear predictive coefficient, i.e., the so-called α parameter by means of the auto-correlation method. The framing interval which becomes the unit of data output is set to approximately 160 samples. When a sampling frequency $f_s$ is, for example, 8 kHz, one frame interval is 160 samples, i.e., 20 msec.

The α parameters from the LPC analysis circuit 132 is sent to an α→LSP conversion circuit 133, and converted to a linear spectrum pair (LSP) parameter. The α parameter derived as the coefficient of a direct type filter is converted to, for example, 10, i.e., 5 pairs of LSP parameters. The conversion is conducted by using the Newton-Raphson method or the like. The conversion to the LSP parameter are conducted because the LSP parameters are more excellent in interpolation characteristics than the α parameter.

The LSP parameter from the α→LSP conversion circuit 133 is subjected to matrix quantization or vector quantization in an LSP quantizer 134. At this time, the vector quantization may be conducted after deriving the difference between frames, or a plurality of frames may be collectively subjected to matrix quantization. Here, 20 msec is allotted to one frame. The LSP parameter calculated at every 20 msec is collected for two frames and subjected to the matrix quantization and vector quantization.

A quantized output from this LSP quantizer 134, i.e., the index of the LSP quantization is taken out via the terminal 102. And the quantized LSP vector is sent to an LSP interpolation circuit 136.

The LSP interpolation circuit 136 interpolates the LSP vector quantized at every 20 msec or 40 msec, and increases the rate to 8 times. In other words, the LSP vector is updated at every 2.5 msec. The reason will now be described. When the residue waveform is analyzed and synthesized by using the harmonic coding/decoding method, the envelope of the synthesized waveform becomes a very gently-sloping and smooth waveform. If the LPC coefficient changes abruptly at every 20 msec, therefore, allophones sometimes occur. By gradually changing the LPC coefficient at every 2.5 msec, occurrence of such allophones can be prevented.

In order to execute inverse-filtering of the input voice by using the LSP vector thus interpolated and supplied at every 2.5 msec, an LSP→α conversion circuit 137 converts the LSP parameters to an a parameter which is a coefficient of, for example, an approximately 10th-order direct type filter. The output of this LSP→α conversion circuit 137 is sent to the LPC inverse filter circuit 111. In this LPC inverse filter circuit 111, inverse filtering processing is conducted by using the α parameter updated at every 2.5 msec and a smooth output is obtained. The output of this LPC inverse filter 111 is sent to an orthogonal transform circuit 145, such as a DFT (discrete Fourier conversion) circuit, of the sinusoidal analysis coding unit 114, or concretely the harmonic coding circuit.

The α parameter from the LPC analysis circuit 132 of the LPC analysis and quantization unit 113 is sent to an auditory sense weighting filter calculation circuit 139 to derive data for auditory sense weighting. The weighted data are sent to the auditory sense weighted vector quantizer 116 described later, and the auditory sense weighting filter 125 and the auditory sense weighting synthesis filter 122 of the second coding unit 120.

In the sinusoidal analysis coding unit 114 such as the harmonic coding circuit or the like, the output of the LPC inverse filter 111 is analyzed by using the method of the harmonic coding. In other words, the pitch detection, calculation of an amplitude Am of each of harmonics, and voiced (V)/unvoiced (UV) decision are conducted, the number of envelopes of harmonics changing with the pitch or the amplitude Am is made to become a constant number by the dimension conversion.

In the concrete example of the sinusoidal analysis coding unit 114 shown in FIG. 3, the ordinary harmonic coding is assumed. Especially in the case of an MBE (multiband excitation) coding, however, modeling is conducted on the assumption that a voiced portion and an unvoiced portion exist at every frequency domain at the same time (within the same block or frame), i.e., every band. In other harmonic coding operations, an alternative decision as to whether the voice in one block or frame is voiced or unvoiced is effected. As for the V/UV at each frame in the ensuing description, "UV for a frame" means that all bands are UV, in the case of application to the MBE coding.

An open loop pitch search unit 141 of the sinusoidal analysis coding unit 114 in FIG. 3 is supplied with the input voiced signal from the input terminal 101. A zero cross counter 142 is supplied with the signal from the HPF (high-pass filter) 109. The orthogonal transform circuit 145 of the sinusoidal analysis coding unit 114 is supplied with the LPC residual or the linear predictive residual from the LPC inverse filter 111. In the open loop pitch search unit 141, the LPC residue of the input signal is derived, and a comparatively rough pitch search by using an open loop is conducted. Extracted coarse pitch data are sent to a high precision pitch search unit 146, and therein subjected to a high-precision pitch search (a fine pitch search) using a closed loop which will be described later. In addition to the coarse pitch data, a normalized auto-correlation maximum value r(p) obtained by normalizing the maximum value of the auto-correlation of the LPC residue by the power is taken out from the open loop pitch search unit 141, and sent to the V/UV (voiced/unvoiced) decision unit 115.

In the orthogonal transform circuit 145, orthogonal transform processing, such as, for example, DFT (discrete Fourier transform) or the like is conducted. The LPC residue on the time axis is converted to spectrum amplitude data on the frequency axis. The output of this orthogonal transform circuit 145 is sent to the high precision pitch search unit 146 and a spectrum evaluation unit 148 for evaluating the spectrum amplitude or the envelope.

The high precision (fine) pitch search unit 146 is supplied with the comparatively rough coarse pitch data extracted by the open loop pitch search unit 141, and the data on the frequency axis subjected to, for example, the DFT in the orthogonal transform unit 145. In this high precision pitch search unit 146, a swing of ±several samples is given around the coarse pitch data value with a step of 0.2 to 0.5, and driving into the value of the fine pitch data with an optimum decimal point (floating) is conducted. At this time, the so-called analysis by synthesis method is used as the technique of the fine search, and the pitch is selected so as to make the synthesized power spectrum closest to the power spectrum of the original sound. As for the pitch data obtained from the high precision pitch search unit 146 by using such a closed loop, the pitch data are sent to the output terminal 104 via the pitch conversion unit 119 and the switch 118. In the case where the pitch conversion is required, the pitch conversion is conducted by processing in the pitch conversion unit 119 which will be described later.

In the spectrum evaluation unit 148, the magnitude of each of harmonics and a spectrum envelope which is an assemblage of them are evaluated on the basis of the spectrum amplitude and the pitch obtained as the orthogonal transform output of the LPC residual, and sent to the high precision pitch search unit 146, the V/UV (voiced/unvoiced) decision unit 115, and the auditory sense weighted vector quantizer 116.

On the basis of the output of the orthogonal transform circuit 145, the optimum pitch from the high precision pitch search unit 146, the spectrum amplitude data from the spectrum evaluation unit 148, the normalized auto-correlation maximum value r(p) from the open loop pitch search unit 141, and the zero cross count value from the zero cross counter 142, the V/UV (voiced/unvoiced) decision unit 115 conducts the V/UV decision on the frame. Furthermore, the boundary position of the V/UV decision result for each band in the case of the MBE may also be used as one condition of the V/UV decision. The decision output from the V/UV decision unit 115 is taken out via the output terminal 105.

In an output portion of the spectrum evaluation unit 148 or an input portion of the vector quantizer 116, a number of data conversion unit (for conducting a kind of sampling rate conversion) is provided. Taking into consideration the fact that the number of division bands on the frequency axis and the number of data differ depending upon the pitch, the number of data conversion unit is provided to make the number of amplitude data |Am| of the envelope constant. If it is assumed that the effective band extends up to, for example, 3400 kHz, this effective band is divided into 8 to 63 bands according to the pitch. The number $m_{MX}+1$ of the amplitude data |Am| obtained at each of these bands also changes in the range of 8 to 63. In the number of data conversion unit 119, therefore, a variable number $m_{MX}+1$ of the amplitude data are converted to a constant number M of data, such as, for example, 44 data.

A constant number M of (for example, 44) amplitude data or envelope data supplied from the number of data conversion unit disposed at the output portion of the spectrum evaluation unit 148 or the input portion of the vector quantizer 116 are put together at every predetermined number of data, such as, for example, 44 data, converted to a vector, and subjected to weighted vector quantization, in the vector quantizer 116. The weight is given by the output of the auditory sense weighting filter calculation circuit 139. The envelope index from the vector quantizer 116 is taken out from the output terminal 103 via the switch 117. Prior to the weighted vector quantization, an interframe difference using an appropriate leak coefficient may be derived with respect to a vector formed by a predetermined number of data.

The second coding unit 120 will now be described. The second coding unit 120 has a so-called CELP (code excitation linear predictive) coding configuration, and it is used especially for coding the unvoiced portion of the input voice signal. In this CELP coding configuration for the unvoiced portion, a noise output corresponding to the LPC residue of the unvoiced sound which is a representative output from the noise code book, i.e., the so-called stochastic code book 121 is sent to the auditory sense weighting synthesis filter 122 via a gain circuit 126. In the weighting synthesis filter 122, the inputted noise is subjected to LPC synthesis processing. A resultant weighted unvoiced signal is sent to the subtracter 123. The subtracter 123 is supplied with a signal obtained by applying auditory sense weighting, in the auditory sense weighting filter 125, to the voice signal supplied from the input terminal 101 via the HPF (high-pass filter) 109. The difference or error between this signal and the signal supplied from the synthesis filter 122 is thus taken out. This error is sent to the distance calculation circuit 124 to conduct a distance calculation. Such a representative value vector as to minimize the error is searched for by the noise code book 121. Vector quantization of time-axis waveform using the analysis by synthesis method and the closed loop search is conducted.

As the data for the UV (unvoiced) portion from the second coding unit 120 using the CELP coding configuration, a shape index of the code book from the noise code book 121 and a gain index of the code book from the gain circuit 126 are taken out. The shape index which is the UV data from the noise code book 121 is sent to an output terminal 107*s* via a switch 127*s*. The gain index which is the UV data of the gain circuit 126 is sent to an output terminal 107*g* via a switch 127*g*.

These switches 127*s* and 127*g*, and the switches 117 and 118 are controlled so as to turn on/off by the V/UV decision result from the V/UV decision unit 115. The switches 117 and 118 turn on when the V/UV decision result of the voice signal of a frame to be currently transmitted is voiced (V). The switches 127*s* and 127*g* turn on when the voice signal of a frame to be currently transmitted is unvoiced (UV).

Figure 4:
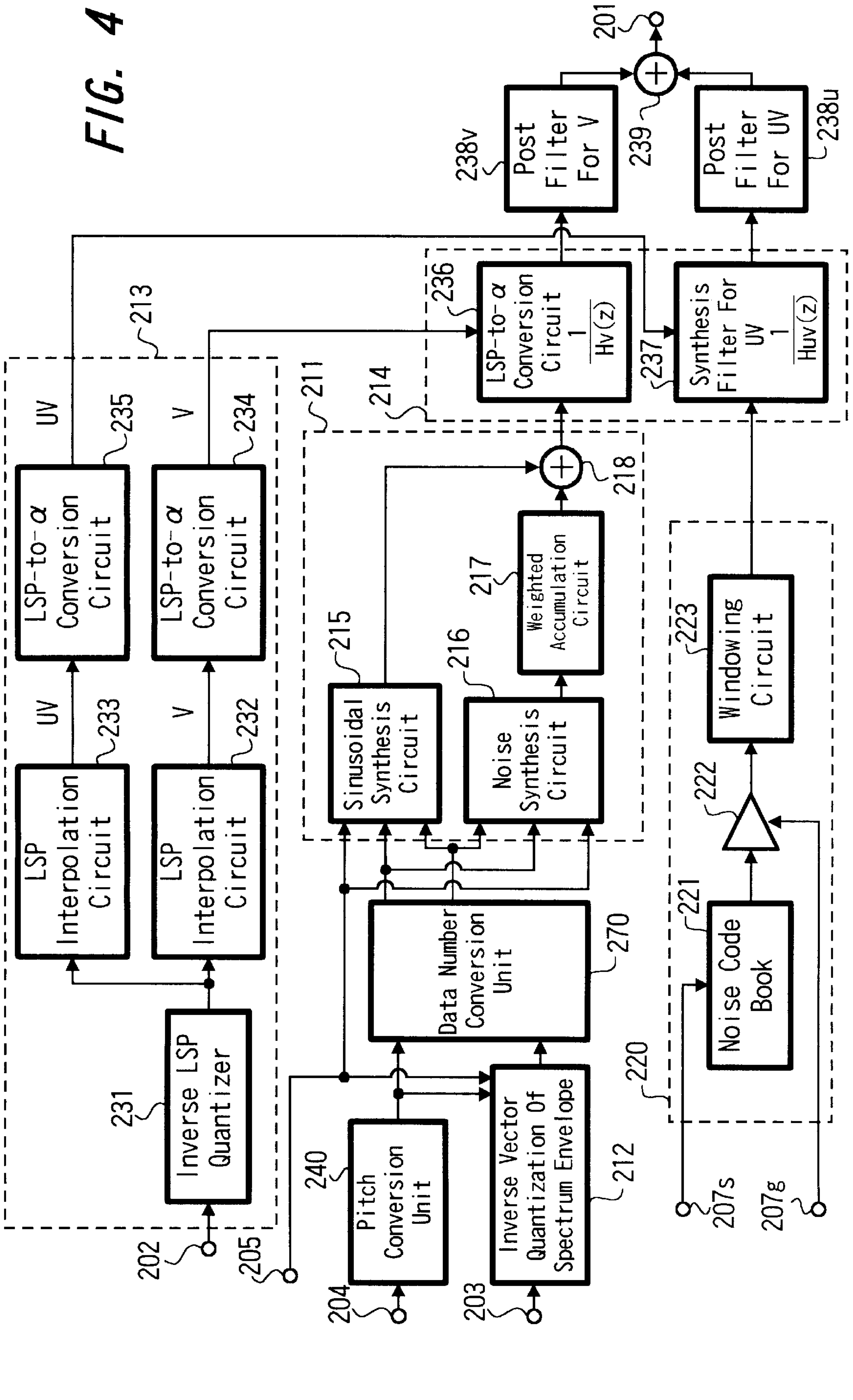
FIG. 4 is a block diagram showing a more concrete configuration of the voiced signal decoding device of FIG. 2.

By referring to FIG. 4, a more concrete configuration of the voiced signal decoding device shown in FIG. 2 will now be described. In FIG. 4, components corresponding to those of FIG. 2 are denote d by the like reference numerals.

In FIG. 4, the input terminal 202 is supplied with the vector quantization output of the LSP, i.e., the so-called index of the code book corresponding to the output from the output terminal 102 of FIGS. 1 and 3.

The index of the LSP is sent to an LSP inverse vector quantizer 231 of the LPC parameter regeneration unit 213, inverse vector quantized to LSP (linear spectrum pair) data therein, sent to LSP interpolation circuits 232 and 233, subjected therein to LSP interpolation processing, and thereafter sent to LSP→α conversion circuits 234 and 235. The LSP interpolation circuit 232 and the LSP→α conversion circuit 234 a re provided for voiced (V) sounds. The LSP interpolation circuit 233 and the LSP→α conversion circuit 235 are provided for unvoiced (UV) sounds. In the LPC synthesis filter 214, an LPC synthesis filter 236 for voiced portions and an LPC synthesis filter 237 for unvoiced portions are separated. In other words, LPC coefficient interpolation is conducted independently in voiced portions and unvoiced portions. In a transition portion from a voiced sound to an unvoiced sound and a transition portion from an unvoiced sound to a voiced sound, a bad influence caused by mutually interpolating LSPs having completely different properties is thus avoided.

The input terminal 203 of FIG. 4 is supplied with the code index data of the spectrum envelope (Am) subjected to weighting vector quantization, which corresponds to the output from the terminal 103 of the encoder side shown in FIGS. 1 and 3. The input terminal 204 is supplied with the pitch data from the terminal 104 of FIGS. 1 and 3. The input terminal 205 is supplied with the V/UV decision data from the terminal 105 of FIGS. 1 and 3.

The vector quantized index data of the spectrum envelope Am from the input terminal 203 is sent to the inverse vector quantizer 212 and subjected therein to inverse vector quantization. As described above, the number of the amplitude data of the envelope thus subjected to inverse vector quantization is set equal to a constant number, such as, for example, 44. The conversion in a number of data is conducted so as to yield a number of harmonics according to the pitch data. The number of data sent from the inverse quantizer 212 to the data conversion unit 270 may remain the constant number or may be converted in the number of data.

The data conversion unit 270 is supplied with the pitch data from the input terminal 204 via the pitch conversion unit 215, and outputs an encoded pitch. In the case where pitch conversion is necessary, the pitch conversion is conducted by processing in the pitch conversion unit 215 which will be described later. As many amplitude data as corresponding to the preset pitch of the spectrum envelope of the LPC residual from the data conversion unit 270, and the altered pitch data are sent to a sinusoidal synthesis circuit 215 of the voiced signal synthesis unit 211.

For converting the number of amplitude data of the spectrum envelope of the LPC residue in the data conversion unit 270, various interpolation methods are conceivable. In an example of the methods, amplitude data corresponding to one block of the effective band on the frequency axis is subjected to the following processing. Such dummy data as to interpolate values from the tail data in the block to the head data in the block are add ed to expand the number of data to $N_F$. Or data located at the left end and the right end in the block (the head and the tail) are extended as dummy data. Thereafter, oversampling of $O_s$ times (such as, for example, 8 times) of the band limiting type is effected to derive as many as $O_s$ times amplitude data. The amplitude data of $O_s$ times in number $((m_{MX}+1)\times O_s)$ amplitude data) are subjected to linear interpolation and thereby expanded to more data, i.e., $N_M$ (such as, for example, 2048) data. The $N_M$ data are thinned and thereby converted to as many M data as corresponds to the preset pitch.

In the data conversion unit 270, only positions where harmonics stand are altered without changing the shape of the spectrum envelope. Therefore, the phonemes remain unchanged.

As an example of operation in the data conversion unit 270, the case where a frequency $F_0=f_s/L$ at the time of a pitch lag L is converted to Fx will now be described. The $f_s$ is the sampling frequency. It is now assumed that $f_s$=8 kHz=8000 Hz, for example.

At this time, the pitch frequency $F_0$=8000/L. Up to 4000 Hz, n=L/2 harmonics are standing. In the 3400 Hz width of the typical voice band, approximately (L/2)×(3400/4000) harmonics are standing. This is converted to a constant number such as 44 by the above described conversion in the number of data or dimension conversion, and thereafter subjected to vector quantization.

If at the time of encoding interframe difference is derived prior to the vector quantization of the spectrum, then the interframe difference is decoded after inverse vector quantization and the conversion in the number of data is conducted to derive the spectrum envelope data.

Besides the spectrum envelope amplitude data of the LPC residue and the pitch data from the data conversion unit 270, the above described V/UV decision data from the input terminal 205 is also supplied to the sinusoidal synthesis circuit 215. The LPC residue data is taken out from the sinusoidal synthesis circuit 215 and sent to an adder 218.

The envelope data from the inverse vector quantizer 212, the pitch from the input terminal 204, and the V/UV decision data from the input terminal 205 are sent to a noise synthesis circuit 216 for summing noises of voiced (V) portions. An output from this noise synthesis circuit 216 is sent to the adder 218 via a weighted accumulation circuit 217. If excitation to be inputted to the voiced LPC synthesis filter is produced by the sinusoidal synthesis, then there is a feeling of nasal congestion for a low pitch sound such as a male speech or the like, and the quality of sound suddenly changes between a V (voiced) sound and an UV (unvoiced) sound causing an unnatural feeling. For the input or excitation of the LPC synthesis filter of voiced portions, therefore, noises with due regard to parameters based upon voice coded data, such as the pitch, spectrum envelope amplitude, maximum amplitude in the frame, and the level of the residual signal or the like, are added to voiced portions of the LPC residue signal.

A sum output from the adder 218 is sent to the synthesis filter 236 for voiced sounds of the LPC synthesis filter 214 and subjected to LPC synthesis processing. Resulting temporal waveform data are subjected to filter processing in a post filter 238*v* for voiced sounds, and thereafter sent to an adder 239.

Input terminals 207*s* and 207*g* of FIG. 4 are supplied with the shape index and the gain index fed from the output terminals 107*s* and 107*g* of FIG. 3 as the UV data, respectively. The shape index and the gain index are sent to the unvoiced synthesis unit 220. The shape index from the terminal 207*s* is sent to a noise code book 221 of the unvoiced synthesis unit 220. The gain index from the terminal 207*g* from the terminal 207*g* is sent to a gain circuit 222. A representative value output read from the noise code book 221 is a noise signal component corresponding to the LPC residue of unvoiced sounds. This becomes an amplitude of a predetermined gain in the gain circuit 222, sent to a window circuit 223, and subjected to window processing for smoothing joints to voiced sounds.

As the output from the unvoiced synthesis unit 220, an output of the window circuit 223 is sent to the UV (unvoiced) synthesis filter 237 of the LPC synthesis filter 214, and in the synthesis filter 237 the output is subjected to LPC synthesis processing, resulting in temporal waveform data of unvoiced portions. The temporal waveform data of unvoiced portions are subjected to filter processing in an unvoiced post filter 238*u* and thereafter sent to the adder 239.

In the adder 239, the temporal waveform signal of voiced portions from the voiced post filter 238*v* and the temporal waveform signal of unvoiced portions from the unvoiced post filter 238*u* are added together. The sum is taken out from the output terminal 201.

The pitch conversion processing conducted in the pitch conversion unit 119 included in the voiced signal coding apparatus described with reference to FIGS. 1 and 3 and the pitch conversion processing conducted in the pitch conversion unit 240 included in the voiced signal decoding apparatus described with reference to FIGS. 2 and 4 will now be described. The present example is configured so that the pitch conversion of voices may be conducted both at the time of coding and at the time of decoding. In the case where the pitch conversion is desired at the time of coding, corresponding processing is conducted in the pitch conversion unit 119 included in the voiced signal coding apparatus. In the case where the pitch conversion is desired at the time of decoding, corresponding processing is conducted in the pitch conversion unit 240 included in the voiced signal decoding apparatus. Basically, therefore, the pitch conversion processing described in the present example can be executed if either the voiced signal coding apparatus or the voiced signal decoding apparatus has the pitch conversion unit. Voiced signals subjected to the pitch conversion in the voiced signal coding apparatus at the time of coding can be further subjected to the pitch conversion at the time of decoding in the voiced signal decoding apparatus.

Hereafter, details of processing conducted in the pitch conversion unit will be described. The pitch conversion processing conducted in the pitch conversion unit 119 included in the voiced signal coding apparatus and the pitch conversion processing conducted in the pitch conversion unit 215 included in the voiced signal decoding apparatus are basically the same. In each of the conversion units 119 and 240, supplied pitch data is subjected to conversion processing. The pitch data supplied to each of the pitch conversion unit 119 in the present example is a pitch lag (period) as described with reference to FIGS. 1 to 4. The pitch lag is converted to different data by computation processing and the pitch conversion is conducted.

As for the concrete processing of the pitch conversion, selection can be effected out of nine processing states, i.e., first processing through ninth processing hereafter described. On the basis of control conducted in a controller or the like included in the coding device or the decoding device, one of these processing states is set. The pitch shown in numerical formulas in the following description of the processing represents its period. In the actual computation processing in the conversion unit, corresponding processing is conducted with as many data as harmonics.

First Processing

This processing is processing for increasing the input pitch by a constant factor. The input pitch pch_in is multiplied by a constant $K_1$ to yield an output pitch pch_out. The calculation therefor is expressed by the following equation (1).

$$pch\_out=K_1\ pch\_in \quad (1)$$

By setting the value of the constant K1 so as to satisfy the relation $0<K_1<1$, the frequency becomes higher and a change to high-pitched voice is possible. By setting the value of the constant $K_1$ so as to satisfy the relation $K_1>1$, the frequency becomes lower and a change to low-pitched voice is possible.

Second Processing

This processing is processing for making the output pitch constant irrespective of the input pitch. An appropriate preset constant P2 is always set equal to the output pitch pch_out. The calculation therefor is expressed by the following equation (2).

$$pch\_out=P_2 \quad (2)$$

By thus making the pitch constant, conversion to monotonous artificial voice becomes possible.

Third Processing

This processing is processing for making the output pitch pch_out equal to the sum of an appropriate preset constant $P_3$ and a sine wave having an appropriate amplitude $A_3$ and a frequency $F_3$. The calculation therefor is expressed by the following equation (3).

$$pch\_out=P_3+A_3\ \sin\ (2\pi F_3 t_{(n)}) \quad (3)$$

In the formula of [Expression 3], n is the number of frames, and $t_{(n)}$ is a discrete time in the frame and is set by the following equation (4).

$$t_{(n)}=t_{(n-1)}+\Delta t \quad (4)$$

By thus adding a sine wave to a fixed constant pitch, vibratos can be added to artificial voices.

Fourth Processing

This processing is processing for making the output pitch pch_out equal to the sum of the input pitch pitch_in and a uniform random number $[-A_4, A_4]$. The calculation therefor is expressed by the following equation (5).

$$pch\_out=pch\_in+r_{(n)} \quad (5)$$

Here, $r_{(n)}$ is a random number set at every n frame. For each processing frame, a uniform random number $[-A_4, A_4]$ is generated, and addition processing is conducted. By such processing, conversion to a voice such as a clattering voice becomes possible.

Fifth Processing

This processing is processing for making the output pitch pch_out equal to the sum of the input pitch pch_in and a sine wave having an appropriate amplitude $A_5$ and a frequency $F_5$. The calculation therefor is expressed by the following equation (6).

$$pch\_out=pch\_in+A5\ \sin\ (2\pi F_5 t_{(n)}) \quad (6)$$

In the formula of [Expression 6] as well, n is the number of frames, and $t_{(n)}$ is a discrete time in the frame and is set by the formula of [expression 4] described above. By conducting such processing, vibratos can be added to input voices. By providing the frequency $F_5$ with a small value (i.e., lengthening the period) in this case, conversion to voices with rising and falling is conducted.

Sixth Processing

This processing is processing for making the output pitch pch_out equal to an appropriate constant $P_6$ minus the input pitch pch_in. The calculation therefor is expressed by the following equation (7).

$$pch\_out=P_6-pch\_in \quad (7)$$

By conducting such processing, the pitch change becomes opposite to that of the input voice. Conversion to voices having, for example, word endings opposite to those of the ordinary case is conducted.

Seventh Processing

This processing is processing for making the output pitch pch_out equal to an avg_pch obtained by smoothing (averaging) the input pitch pch_in with an appropriate time constant $\tau_7$ (where this time constant $\tau_7$ is in the range $0<\tau_7<1$). The calculation therefor is expressed by the following equation (8).

$$avg\_pch=(1-\tau_7)\ avg\_pch+\tau_7\ pch\_in$$

$$pch\_out=avg\_pch \quad (8)$$

By setting $\tau_7$ equal to, for example, 0.05, the average value of 20 past frames becomes equal to the avg_pch and its value becomes the output pitch. By such processing, conversion to voices having neither rising nor falling and having a loose feeling is conducted.

Eighth Processing

In this processing, an avg_pch obtained by smoothing (averaging) the input pitch pch_in with an appropriate time constant $\tau_8$ (where this time constant $\tau_8$ is in the range $0<\tau_7<1$) is subtracted from the input pitch pch_in. A resultant difference is multiplied by an appropriate factor $K_8$ (where $K_8$ is a constant). A resultant product is added to the input pitch pch_in as an emphasis component to derive the output pitch pch_out. The calculation therefor is expressed by the following equation (9).

$$avg\_pch=(1-\tau_8)\ avg\_pch+\tau_8\ pch\_in$$

$$pch\_out=pch\_in+K_8\ (pch\_in-avg\_pch) \quad (9)$$

By such processing, pitch conversion to such a state that the emphasis component is added to the input voice is conducted. Conversion to voices modulated for effect is thus conducted.

Ninth Processing

This is mapping processing for converting the input pitch pch_in to closest fixed pitch data contained in a pitch table which is prepared in the pitch conversion unit beforehand. In this case, it is conceivable to, for example, prepare data having frequency intervals corresponding to the musical scale as the fixed pitch data contained in the pitch table, and conduct conversion to data having a musical scale closely resembling the input pitch pch_in.

By executing pitch conversion processing of one of the first to ninth processing as heretofore described in the pitch conversion unit 119 included in the coding device or the pitch conversion unit 240 included in the decoding device, only the pitch data controlling the number of harmonics at the time of decoding are converted. Thus only the pitch can be simply converted without changing the phonemes of voices.

Figure 5:
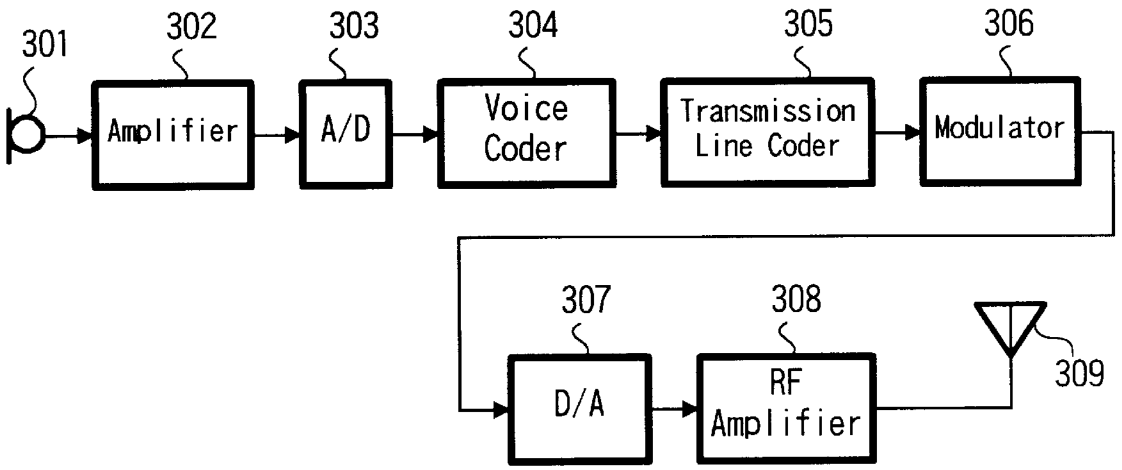
FIG. 5 is a block diagram showing an example of application to a transmission system of a radio telephone apparatus.

Examples of application of the voiced signal coding apparatus and the voiced signal decoding apparatus heretofore described to a telephone apparatus will now be described by referring to FIGS. 5 and 6. First of all, an example of the voiced signal coding apparatus applied to a transmission system of a radio telephone apparatus (such as a portable telephone set) is shown in FIG. 5. A voice signal collected by a microphone 301 is amplified by an amplifier 302, converted to a digital signal by an analog/digital converter 303, and sent to a voice coding unit 304. This voiced signal coding unit 304 corresponds to the voiced signal coding apparatus described with reference to FIGS. 1 and 3. As occasion demands, pitch conversion processing is conducted in a pitch conversion unit included in the coding unit 304 (corresponding to the pitch conversion unit 119 of FIGS. 1 and 3). Each data coded in the voiced signal coding unit 304 is sent to a transmission line coding unit 305 as an output signal of the coding unit 304. In the transmission line coding unit 305, a so-called channel coding processing is conducted. Its output signal is sent to a modulation circuit 306, modulated therein, sent to an antenna 309 via a digital/analog converter 307 and a high frequency amplifier 308, and subjected to radio transmission.

Figure 6:
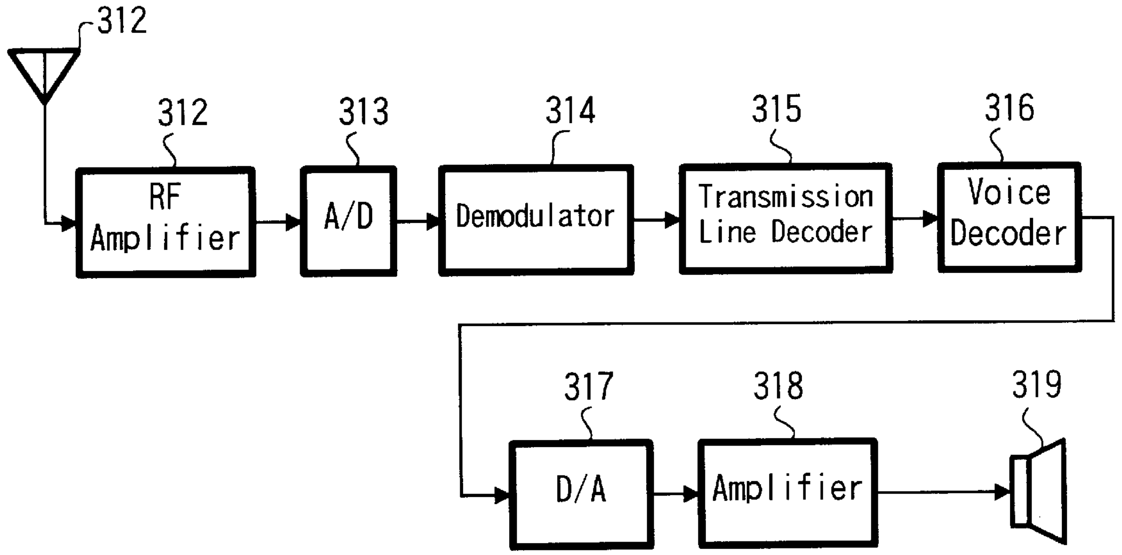
FIG. 6 is a block diagram showing an example of application to a receiving system of a radio telephone apparatus.

An example of application of the voiced signal decoding apparatus to a receiving system of a radio telephone apparatus is shown in FIG. 6. A signal received by an antenna 311 is amplified by a high frequency amplifier 312, and sent to a demodulation circuit 314 via an analog/digital converter 313. The demodulated signal is sent to a transmission line decoding unit 315. In this transmission line decoding unit 315, the voiced signal subjected to channel decoding processing and transmitted is extracted. The extracted voiced signal is sent to a voiced signal decoding unit 316. This voiced signal decoding unit 316 corresponds to the voiced signal decoding apparatus described with reference to FIGS. 2 and 4. As occasion demands, pitch conversion processing is conducted in a pitch conversion unit included in the coding unit 316 (corresponding to the pitch conversion unit of FIGS. 2 and 4). The voiced signal decoded by the voiced signal decoding unit 316 is sent to a digital/analog converter 317 as the output signal of the decoding unit 316, subjected to analog voiced signal processing in an amplifier 318, then sent to a loudspeaker 319, and emanated as voices.

As a matter of course, the present invention can be applied to devices other than such a radio telephone apparatus. In other words, the present invention can be applied to various devices incorporating the voice coding apparatus described with reference to FIG. 1 and the like and handling voiced signals, and to various devices incorporating the voiced signal decoding apparatus described with reference to FIG. 3 and the like and handling voiced signals.

Furthermore, in the case where a processing program corresponding to the processing conducted in the pitch conversion unit 119 of the present example is recorded on a recording medium (such as an optical disk, a magneto-optical disk, or a magnetic tape and so on) on which a processing program for executing the voiced signal coding processing described with reference to FIGS. 1 and 3 has been recorded, and the processing program read out from this medium is executed in a computer device or the like to conduct coding, similar pitch conversion processing may be executed. Similarly, in the case where a processing program corresponding to the processing conducted in the pitch conversion unit 240 of the present example is recorded on a recording medium on which a processing program for executing the voiced signal decoding processing described with reference to FIGS. 2 and 4 has been recorded, and the processing program read out from this medium is executed in a computer device or the like to conduct decoding, similar pitch conversion processing may be executed.

According to the voiced signal coding method of the present invention, the pitch component of the voiced signal coded data subjected to the sinusoidal analysis coding is altered by the predetermined computation processing to conduct the pitch conversion. As a result, it is possible to convert only the pitch precisely and conduct coding with simple computation processing without changing the phoneme of the input voice.

In this case, the conversion in the number of data for making the number of harmonics equal to a predetermined number is conducted. As a result, pitch conversion based upon the coded data can be simply conducted.

In the case where this conversion in the number of data is to be conducted, the conversion processing in the number of data is conducted by interpolation processing using the oversampling computation. As a result, conversion in the number of data can be conducted by simple processing using oversampling computation.

Furthermore, in the case where pitch conversion is conducted at the time of coding, the pitch component of the voice coded data subjected to the sinusoidal analysis coding is multiplied by the predetermined coefficient to conduct the pitch conversion. As a result, such pitch conversion processing as to change the tone quality of the input voice, for example, becomes possible.

Furthermore, in the case where pitch conversion is conducted at the time of coding, the pitch component of the voiced signal coded data subjected to the sinusoidal analysis coding is converted to a fixed value and always converted to a constant pitch. For example, therefore, the pitch of the input voice can be converted to a monotonous artificial voice.

Furthermore, in the case where conversion to this constant pitch is to be conducted, data of a sine wave having a predetermined frequency are added to the data converted to the constant pitch. As a result, conversion to a voiced signal having, for example, vibratos above and below the constant pitch serving as the center becomes possible.

Furthermore, in the case where pitch conversion is to be conducted at the time of coding, the pitch component of voice coded data subjected to the sinusoidal analysis coding is subtracted from a predetermined constant value to conduct the pitch conversion. As a result, conversion to a pitch bringing about, for example, such an effect that the intonation or the like of word's ending of the input voice changes inversely becomes possible.

Furthermore, in the case where pitch conversion is to be conducted at the time of coding, a predetermined random number is added to the pitch component of the voice coded data subjected to the sinusoidal analysis coding to conduct the pitch conversion. As a result, conversion to such a pitch that the intonation or the like of the voice changes irregularly becomes possible.

Furthermore, in the case where pitch conversion is to be conducted at the time of coding, data of a sine wave having a predetermined frequency is added to the pitch component of the voice coded data coded by using the sinusoidal analysis coding and thereby the pitch conversion is conducted. As a result, conversion to, for example, such a voice as to be obtained by adding vibratos to the input voice becomes possible.

Furthermore, in the case where pitch conversion is to be conducted at the time of coding, an average value of the pitch component of the voiced signal coded data subjected to the sinusoidal analysis coding is calculated and this average value is used as the voiced signal coded data subjected to the pitch conversion. As a result, conversion to, for example, a voice reduced in rising and falling from the input voice becomes possible.

Furthermore, in the case where pitch conversion is to be conducted at the time of coding, an average value of the pitch component of the voiced signal coded data subjected to the sinusoidal analysis coding is calculated and a difference between the voiced signal coded data and the average value is added to the voiced signal coded data to conduct the pitch conversion. As a result, conversion to, for example, a voice emphasized in rising and falling of the input voice and modulated for effect becomes possible.

In the case where pitch conversion is to be converted at the time of coding, the pitch component of the voiced signal coded data subjected to the sinusoidal analysis coding is converted to data of a pitch conversion table prepared beforehand and converted to a pitch of a step set in this pitch conversion table. As a result, such conversion, for example, as to normalize the pitch of the input voice to a pitch of a constant musical scale becomes possible.

According to the voiced signal decoding method of the present invention, the pitch component of data subjected to the sinusoidal analysis coding is altered by predetermined computation processing. As a result, only the pitch of the decoded voiced signal can be converted precisely by using simple computation processing without changing the phonemes of the voice.

In this case, the pitch component is altered, and thereafter the conversion in the number of data from a predetermined number is conducted for the number of harmonics. As a result, decoding by means of the altered pitch component can be conducted simply.

Furthermore, in the case where this conversion in the number of data is to be conducted, the number of data conversion processing is conducted with the interpolation processing using the oversampling computation. As a result, the conversion in the number of data can be conducted with simple processing using the oversampling computation.

Furthermore, in the case where pitch conversion is conducted at the time of decoding, the pitch component of the voiced signal coded data subjected to the sinusoidal analysis coding is multiplied by a predetermined coefficient to conduct the pitch conversion. As a result, such pitch conversion processing as to, for example, change the tone quality of the decoded voiced signal becomes possible.

Furthermore, in the case where the pitch conversion is conducted at the time of decoding, the pitch component of the voiced signal coded data subjected to the sinusoidal analysis coding is converted to a fixed value and always converted to a constant pitch. For example, therefore, the pitch of the decoded voiced signal can be converted to a monotonous artificial voice.

Furthermore, in the case where conversion to this constant pitch is to be conducted, data of a sine wave having a predetermined frequency are added to the data converted to the constant pitch. As a result, conversion to a voice having, for example, vibratos above and below the constant pitch serving as the center becomes possible.

Furthermore, in the case where pitch conversion is to be conducted at the time of decoding, the pitch component of voiced signal coded data subjected to the sinusoidal analysis coding is subtracted from a predetermined constant value to conduct the pitch conversion. As a result, conversion to a pitch bringing about, for example, such an effect that the intonation or the like of word's ending of the decoded voiced signal changes inversely becomes possible.

Furthermore, in the case where pitch conversion is to be conducted at the time of decoding, a predetermined random number is added to the pitch component of the voiced signal coded data subjected to the sinusoidal analysis coding to conduct the pitch conversion. As a result, conversion to such a pitch that, for example, the intonation or the like of the decoded voiced signal changes irregularly becomes possible.

Furthermore, in the case where pitch conversion is to be conducted at the time of decoding, data of a sine wave having a predetermined frequency is added to the pitch component of voiced signal coded data coded by using the sinusoidal analysis coding and thereby the pitch conversion is conducted. As a result, conversion to, for example, such a voice as to be obtained by adding vibratos to the decoded voiced signal becomes possible.

Furthermore, in the case where pitch conversion is to be conducted at the time of decoding, an average value of the voiced signal coded data subjected to the sinusoidal analysis coding is calculated and this average value is used as the voiced signal coded data subjected to the pitch conversion. As a result, conversion to, for example, a voiced signal reduced in rising and falling of the decoded voiced signal becomes possible.

Furthermore, in the case where pitch conversion is to be conducted at the time of decoding, an average value of the pitch component of the voiced signal coded data subjected to the sinusoidal analysis coding is calculated and a difference between the voiced signal coded data and the average value is added to the voiced signal coded data to conduct the pitch conversion. As a result, conversion to, for example, a voiced signal emphasized in rising and falling of the decoded voiced signal and modulated for effect becomes possible.

In the case where pitch conversion is to be converted at the time of decoding, the pitch component of the voiced signal coded data subjected to the sinusoidal analysis coding is converted to data of a pitch conversion table prepared beforehand and converted to a pitch of a step set in this pitch conversion table. As a result, such conversion, for example, as to normalize the pitch of the input voice to be decoded to a pitch of a constant musical scale becomes possible.

The voiced signal coding apparatus of the present invention has the pitch conversion means for converting the pitch component of the data subjected to analysis and coding in the sinusoidal analysis coding means. In a simple processing configuration using conversion processing of the pitch component of the data subjected to the sinusoidal analysis coding, therefore, it becomes possible to convert only the pitch precisely and conduct coding without changing the phonemes of the input voice.

In this case, the conversion in the number of data for making the number of harmonics equal to a predetermined number is conducted. As a result, coding can be conducted in a simple processing configuration. In addition, pitch conversion based upon the coded data can be simply conducted.

Furthermore, the conversion processing in the number of data is conducted by interpolation processing using the band-limited oversampling filter. As a result, conversion in the number of data can be conducted in a simple processing configuration using the oversampling filter.

According to the voice decoding apparatus of the present invention, the pitch component of the data subjected to the sinusoidal analysis coding is converted by pitch conversion means, and decoding processing is conducted in the voiced signal decoding means by using the converted data subjected to the sinusoidal analysis coding and coded data based upon the linear predictive residue. In a simple processing configuration, therefore, it becomes possible to convert only the pitch of the decoded voiced signal precisely without changing the phonemes of the voice.

In this case, the conversion in the number of data from a predetermined number is conducted for the number of harmonics. As a result, decoding of the converted pitched can be conducted in a simple processing configuration for only converting the number of harmonics.

Furthermore, the conversion processing in the number of data is conducted by interpolation processing using the band-limited oversampling filter. As a result, conversion in the number of data at the time of decoding can be conducted in a simple processing configuration using the oversampling filter.

The telephone apparatus according to the present invention has the pitch conversion means for converting the pitch component of the data subjected to the analysis and coding in the sinusoidal analysis coding means. In a simple configuration, therefore, it becomes possible to easily convert the pitch component of the voice data to be transmitted to a desired state.

According to the pitch conversion method of the present invention, data of a pitch component obtained by conducting the sinusoidal analysis and coding on a voice signal is multiplied by a predetermined coefficient to conduct the pitch conversion. As a result, such pitch conversion as to change the tone quality of the input voice, for example, can be easily conducted.

Furthermore, according to the pitch conversion method of the present invention, data of a pitch component obtained by conducting the sinusoidal analysis and coding on a voiced signal is converted to a fixed value and always converted to a constant pitch. For example, therefore, the pitch of the input voice can be converted to a monotonous artificial voice.

Furthermore, according to the pitch conversion method of the present invention, voiced signal coded data coded by the sinusoidal analysis and coding is subtracted from a predetermined constant value to conduct the pitch conversion. As a result, conversion to a pitch bringing about, for example, such an effect that the intonation or the like of word's ending of the input voice changes inversely becomes possible.

Furthermore, according to the medium of the present invention, a processing program for converting the pitch component of the voiced signal coded data coded by the sinusoidal analysis coding is recorded on a medium having a coding program recorded thereon. By executing this processing program, therefore, it becomes possible to convert only the pitch precisely and conduct the coding without changing the phonemes of the input voice.

Furthermore, according to the medium of the present invention, a pitch conversion processing program for converting the pitch component of the data subjected to the sinusoidal analysis coding is recorded on a medium having a decoding program recorded thereon. By executing this processing program, therefore, it becomes possible to convert only the pitch of the decoded voiced signal precisely without changing the phonemes of the voice.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A voiced signal coding method comprising the steps of:

dividing a voiced signal on a time axis at a predetermined voiced signal unit;

deriving a linear predictive residual at each voiced signal unit divided from said voiced signal;

conducting sinusoidal analysis coding for each voiced signal unit based on said linear predictive residual to produce voiced signal coded data for each voiced signal unit; and altering a pitch component of said voiced signal coded data by a predetermined computation processing without changing phonemes of said voiced signal.

2. A voiced signal coding method according to claim 1, further comprising the step of coding processing carried out by harmonics coding, wherein conversion of a number of harmonics data to a predetermined number is conducted.

3. A voiced signal coding method according to claim 2, wherein said conversion of said number of harmonics data is conducted by interpolation processing using an oversampling computation.

4. A voiced signal coding method according to claim 1, wherein said pitch component of said voiced signal coded data is multiplied by a predetermined coefficient in order to conduct pitch conversion.

5. A voiced signal coding method according to claim 1, wherein said pitch component of said voiced signal coded data is converted to a fixed value and always converted to data of a constant pitch.

6. A voiced signal coding method according to claim 5, wherein data of a sine wave having a predetermined frequency is added to said data of said constant pitch.

7. A voiced signal coding method according to claim 1, wherein said pitch component of said voiced signal coded data is subtracted from a predetermined constant value in order to conduct pitch conversion.

8. A voiced signal coding method according to claim 1, wherein a predetermined random number is added to said pitch component of said voiced signal coded data in order to conduct pitch conversion.

9. A voiced signal coding method according to claim 1, wherein data of a sine wave having a predetermined frequency is added to said pitch component of said voiced signal coded data in order to conduct pitch conversion.

10. A voiced signal coding method according to claim 1, wherein an average value of said pitch component of said voiced signal coded data is calculated and said average value is used as said voiced signal coded data.

11. A voiced signal coding method according to claim 1, wherein an average value of said pitch component of said voiced signal coded data is calculated and a difference between said voiced signal coded data and said average value is added to said voiced signal coded data in order to conduct pitch conversion.

12. A voiced signal coding method according to claim 1, wherein said pitch component of said voiced signal coded data is converted to data of a predetermined pitch conversion table and converted to a pitch of a step set in said pitch conversion table.

13. A voiced signal decoding method in which a voiced signal is decoded based on linear predictive residual data of a predetermined coding unit on a time axis and data subjected to sinusoidal analysis coding, said voiced signal decoding method comprising the step of altering a pitch component of said data subjected to said sinusoidal analysis coding by a predetermined computation processing without changing phonemes of said voiced signal.

14. A voiced signal decoding method according to claim 13, wherein said pitch component is altered by said predetermined computation processing and thereafter conversion processing for making a number of harmonics in a harmonics coding process a predetermined number is conducted.

15. A voiced signal decoding method according to claim 14, wherein said conversion processing is conducted by an interpolation process using an oversampling computation.

16. A voiced signal decoding method according to claim 13, wherein said pitch component of said data subjected to said sinusoidal analysis coding is multiplied by a predetermined coefficient to conduct pitch conversion.

17. A voiced signal decoding method according to claim 13, wherein said pitch component of said data subjected to said sinusoidal analysis coding is converted to a fixed value and always converted to data of a constant pitch.

18. A voiced signal decoding method according to claim 17, wherein data of a sine wave having a predetermined frequency are added to said data of said constant pitch.

19. A voiced signal decoding method according to claim 13, wherein said pitch component of said data subjected to said sinusoidal analysis coding is subtracted from a predetermined constant value to conduct said pitch conversion.

20. A voiced signal decoding method according to claim 13, wherein a predetermined random number is added to said pitch component of said data subjected to said sinusoidal analysis coding to conduct pitch conversion.

21. A voiced signal decoding method according to claim 13, wherein data of a sine wave having a predetermined frequency is added to said pitch component of said data subjected to said sinusoidal analysis coding to conduct pitch conversion.

22. A voiced signal decoding method according to claim 13, wherein an average value of said pitch component of said data subjected to said sinusoidal analysis coding is calculated and said average value is used as said data subjected to pitch conversion.

23. A voiced signal decoding method according to claim 13, wherein an average value of said pitch component of said data subjected to said sinusoidal analysis coding is calculated and a difference between said data and said average value is added to said data to conduct pitch conversion.

24. A voiced signal decoding method according to claim 13, wherein said pitch component of said data subjected to said sinusoidal analysis coding is converted to data of a predetermined pitch conversion table and converted to a pitch of a step set in said pitch conversion table.

25. A voiced signal coding apparatus comprising:

linear predictive residual computing means for computing a linear predictive residual of an input voiced signal at a predetermined coding unit on a time axis;

sinusoidal analysis coding means for conducting sinusoidal analysis coding on said linear predictive residual computed by said linear predictive residual computing means and producing coded data; and pitch conversion means for converting a pitch component of data subjected to said sinusoidal analysis coding by said sinusoidal analysis coding means without changing phonemes of said voiced signal.

26. A voiced signal coding apparatus according to claim 25, wherein conversion processing for setting a number of harmonics used in harmonics coding to a predetermined number is conducted by said sinusoidal analysis coding means.

27. A voiced signal coding apparatus according to claim 26, wherein said conversion processing is conducted by an interpolation process using a band limit type oversampling filter.

28. A voiced signal decoding apparatus for decoding a voiced signal based on linear predictive residual data at a predetermined coding unit on a time axis and producing data which is subjected to sinusoidal analysis coding, said apparatus comprising:

pitch conversion means for converting a pitch component of said data subjected to said sinusoidal analysis coding without changing phonemes of said voiced signal; and voiced signal decoding means for conducting a decoding process by using said data subjected to said sinusoidal analysis coding and converted by said pitch conversion means and said linear predictive residual data.

29. A voiced signal decoding apparatus according to claim 28, further comprising means for conversion processing for setting a number of harmonics used in harmonics coding to a predetermined number based on said converted pitch component.

30. A voiced signal decoding apparatus according to claim 29, wherein said conversion processing is conducted by an interpolation process using a band limit type oversampling filter.

31. A telephone apparatus comprising:

linear predictive residual detection means for deriving a linear predictive residual of an input voiced signal at a predetermined coding unit on a time axis;

sinusoidal analysis coding means for conducting sinusoidal analysis coding on said linear predictive residual detected by said linear predictive residual detection means and producing coded data;

pitch conversion means for converting a pitch component of said coded data subjected to said sinusoidal analysis coding by said sinusoidal analysis coding means without changing phonemes of said voiced signal and producing converted data; and transmission means for transmitting said converted data subjected to said sinusoidal analysis coding and said pitch conversion and said linear predictive residual data onto a predetermined transmission line.

32. A pitch conversion method comprising the step of multiplying data of a pitch component obtained by conducting sinusoidal analysis and coding on a voiced signal with a predetermined coefficient to conduct pitch conversion without changing phonemes of said voiced signal.

33. A pitch conversion method comprising the step of converting data of a pitch component obtained by conducting sinusoidal analysis and coding on a voiced signal to a fixed value which is always converted to data of a constant pitch without changing phonemes of said voiced signal.

34. A pitch conversion method comprising the step of subtracting data of a pitch component obtained by conducting a sinusoidal analysis and coding on a voiced signal from a predetermined constant value to conduct pitch conversion without changing phonemes of said voiced signal.

35. A medium having a program recorded thereon which conducts a process for dividing an input voiced signal at a predetermined coding unit on a time axis, a process for computing a linear predictive residual at each coding unit from said voiced signal, and a process for conducting sinusoidal analysis coding on said computed linear predictive residual to produce voiced signal coded data, said medium comprising a recorded processing program for converting a pitch component of said voiced signal coded data subjected to said sinusoidal analysis coding without changing phonemes of said voiced signal.

36. A medium having a processing program recorded thereon which conducts decoding of a voiced signal based on linear predictive residual data at a predetermined coding unit on a time axis and data subjected to sinusoidal analysis coding, said medium comprising a recorded pitch conversion processing program for converting a pitch component of said data subjected to said sinusoidal analysis coding without changing phonemes of said voiced signal.

* * * * *